United States Patent [19]

Ferguson, Jr.

[11] 4,349,302
[45] Sep. 14, 1982

[54] PALLET LATCHING MECHANISM

[75] Inventor: Jesse T. Ferguson, Jr., La Canada, Calif.

[73] Assignee: Lockheed Corporation, Burbank, Calif.

[21] Appl. No.: 166,577

[22] Filed: Jul. 7, 1980

[51] Int. Cl.³ .............................. B60P 1/64; B60P 7/08; B61D 45/00; B63B 25/22
[52] U.S. Cl. ......................................... 410/69; 410/46; 410/78; 410/79; 410/92
[58] Field of Search ................... 198/746; 410/69, 70, 410/77, 78, 79, 80, 84, 85, 86, 87, 92, 46

[56] References Cited

U.S. PATENT DOCUMENTS

| | | | |
|---|---|---|---|
| 3,698,679 | 10/1972 | Lang et al. | 410/69 |
| 3,796,397 | 3/1974 | Alberti | 410/79 |
| 3,899,092 | 8/1975 | Nordstrom | 410/87 |
| 3,906,870 | 9/1975 | Alberti | 410/79 |
| 3,933,101 | 1/1976 | Blas | 410/69 |
| 3,986,460 | 10/1976 | Voigt et al. | 410/69 |
| 3,995,562 | 12/1976 | Nordstrom | 410/79 |
| 4,089,275 | 5/1978 | Pelletier | 410/79 |
| 4,121,789 | 10/1978 | Lent et al. | 410/77 |
| 4,144,821 | 3/1979 | Lang | 410/79 |
| 4,154,334 | 5/1979 | Ivanov et al. | 198/746 |

*Primary Examiner*—Joseph F. Peters, Jr.
*Assistant Examiner*—Howard Beltran
*Attorney, Agent, or Firm*—Victor A. DiPalma

[57] ABSTRACT

The device is a cargo restraint mechanism for restraining cargo pallets. The mechanism includes two links rotatably attached to a frame member, and a latch member pivotally attached to the links. One link is provided with a lever and the latch includes a cargo restraint lip. The mechanism is erected by pressing the lever thereby raising the restraint lip above the plane of the top surface of the frame and into a cargo pallet engaging position. A downward force delivered to the top surface of the restraint lip retracts the restraint mechanism beneath the plane of the top surface of the frame. A helper leaf spring follows a cam surface on the other link causing a snap-type action in the mechanism. The frame may include an additional mechanism such as a separately actuatable and retractable seat pallet guide.

16 Claims, 9 Drawing Figures

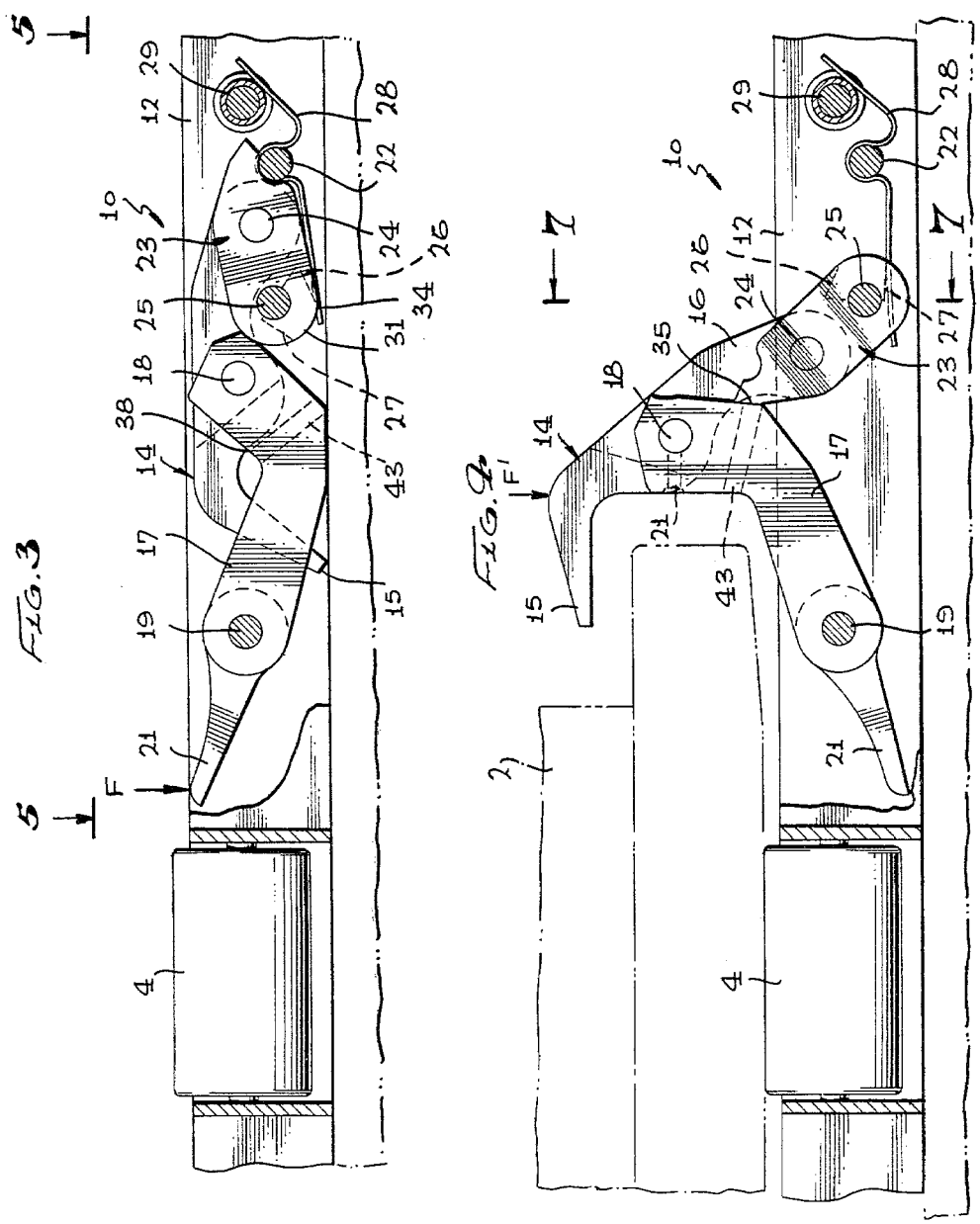

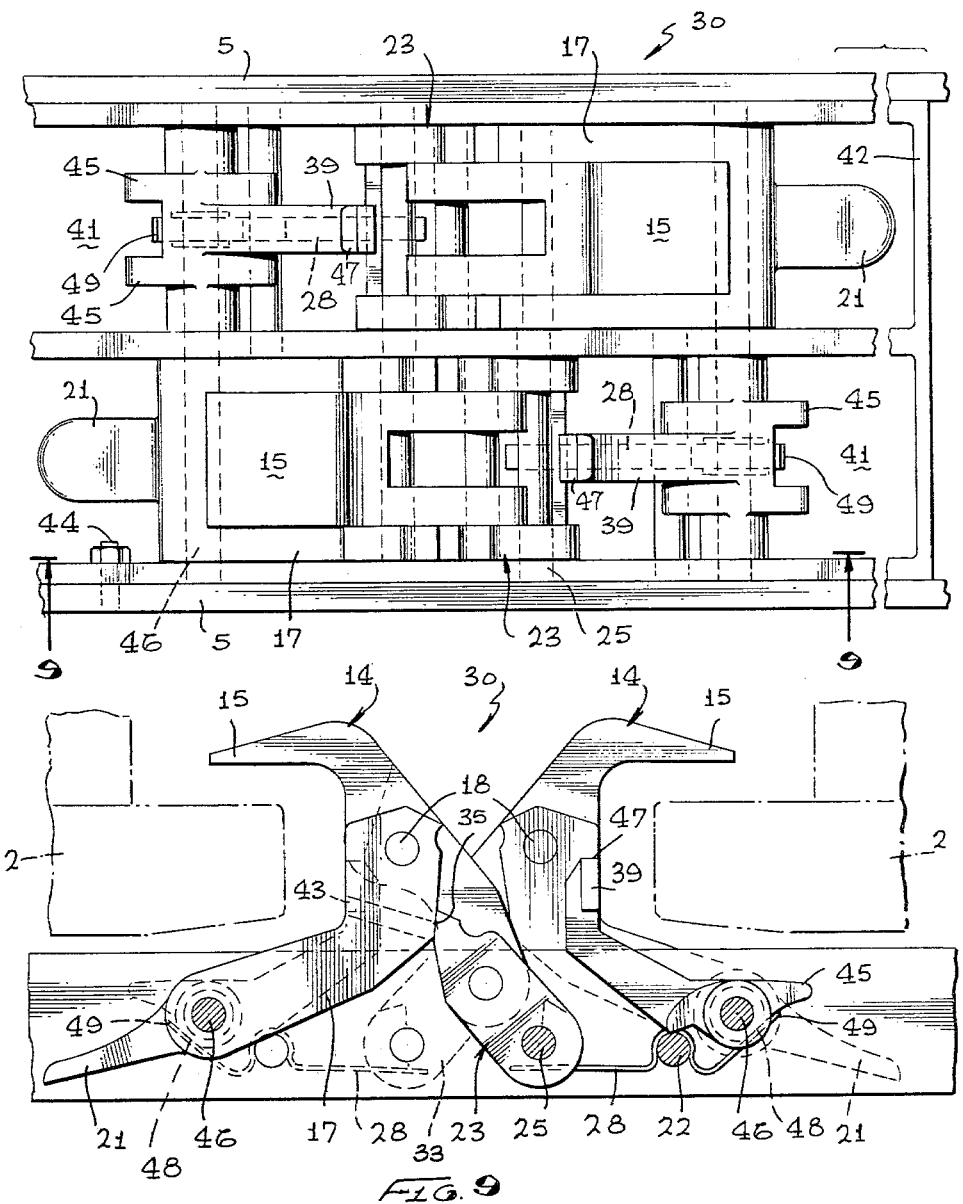

PALLET LATCHING MECHANISM

TECHNICAL FIELD

The invention relates generally to the field of cargo unit load device restraining modules and more particularly to a retractable center guide and side cargo restraint module adapted for use in quick-change passenger/cargo airplanes.

BACKGROUND ART

Cargo is frequently transported in containers or pallets, generally referred to as unit load devices, to aid in facilitating loading, unloading and constraining operations. Use of such cargo containers and pallets is particularly desirable when the transport vehicle used is an airplane. When cargo is shipped by aircraft it becomes particularly important that the containers or pallets be securely fastened to the aircraft floor structure to prevent shifting of the cargo during takeoff, landing, and in-flight, where sudden loading conditions may be encountered. In attempting to control and prevent such cargo shifts, and to assist in the loading and unloading of cargo, often quite complex and expensive cargo handling and restraint systems have been devised. One such somewhat complex system is depicted in U.S. Pat. No. 3,899,092 to Nordstrom. The U.S. Pat. No. 3,899,092 patent discloses a modular cargo carrying system which includes beam assemblies, roller trays, and foot operated locks for restraining cargo containers. Such a system is quite complex and expensive, and does not economically and readily lend itself to utilization in a vehicle such as a quick-change passenger/cargo airplane.

In utilizing an airplane for transporting cargo, a large portion of the aircraft floor is typically open to receive cargo. When converting the aircraft from cargo to passenger service, it then becomes necessary to install seats on the floor area which was previously used for cargo. Understandably, it is quite desirable to minimize the time it takes to convert the craft from cargo to passenger, and from passenger to cargo, while simultaneously minimizing the original installation cost and maintenance of any system or devices utilized to speed such conversion.

One approach which has been adopted to enable rapid change from cargo to passenger configurations and vice versa has been to utilize a pallet-supporting structure which will receive either cargo or seat pallets. In such a system, extendable and retractable pallet restraint mechanisms have been provided for securing the pallets to the floor of the aircraft. When it is desired to move cargo or passenger seat pallets over these mechanisms, they are simply retracted below floor level until needed. When needed to perform a restraining function, they can be selectively extended.

In wide body aircrafts, such as the Boeing 747 and the Lockheed L-1011, use of as many as five hundred restraining mechanisms would not be unusual. Thus, a simplicity of construction and cost become quite critical factors. Moreover, simplicity of operation, and the time and effort required to extend and retract such mechanisms, become additional critical factors for changeover in such a large type of vehicle. Finally, because of the critical weight/space considerations attendant to aircraft design, it would be highly desirable to produce a restraint module which, while being strong enough to carry out the intended restraining function, and simple and inexpensive enough to save production and conversion time, is also of a design which will take up a minimum of vertical space in the aircraft cabin. Typically, such retractable and extendable modules take up from 2 to 5 inches, but an efficient, simple and economical module which takes up to about 1 to 1¼ inches would obviously be most desirable.

U.S. Pat. No. 3,906,870 to Alberti shows another retractable cargo restraint mechanism and center-guide means which is quite complex and expensive. Somewhat simpler restraints are depicted in U.S. Pat. Nos. 3,796,397 to Alberti, 3,986,460 to Voigt et al, 3,995,562 to Nordstrom, 4,089,275 to Pelletier, 4,121,789 to Lent, and 4,144,821 to Lang. These patents all show extendable-retractable fore-aft type restraints for cargo handling systems, and share a degree of high cost and complexity of construction and operation, which make them less than ideal for use as a center-guide and side restraint in large quick-change passenger/cargo airplanes.

The container latch of the U.S. Pat. No. 3,796,397 patent to Alberti utilizes a spring loaded pawl to secure a latch-head assembly in an upright extended cargo engaging position. The mechanism requires a somewhat time consuming manual operation and is constructed such that spring failure is critical to the operation of the device. A somewhat sipler-to-activate device is depicted in the U.S. Pat. No. 3,995,562 patent to Nordstrom. The pallet lock in this patent can be retracted and elevated by foot actuation, but requires the operation of springs to carry out the elevation operation, in that the operator's foot merely releases a lock mechanism. Thus, this device is somewhat complex and susceptible to failure in the event of spring failure. In addition, the foot operation to retract requires a double motion, that is, it requires a sideways movement of the foot as well as a downward movement. Moreover, the mechanism is quite complex in involving interaction of locking pawls, springs, etc., and does not readily lend itself to a 1 to 1¼ inch height of construction.

Another pallet lock mechanism which is at least partly operated by foot is depicted in the U.S. Pat. No. 4,089,275 patent to Pelletier. However, the foot operation merely releases a locking mechanism, after which the lock is retracted under the action of a spring force. The lock is elevated by a hand operation. Again, spring action is critical to the operation of the locking mechanism, and the lock is rather complex and expensive in requiring a multiplicity of triggers, springs and the like. Such a system is also not readily adaptable to construction for a 1¼ inch system.

The U.S. Pat. Nos. 4,121,789, 4,144,821 and 3,986,460 patents all offer additional variations on cargo restraint locks, and all are unduly complex in also requiring the use of springs (for successful activation), release mechanisms, and locks, etc. While manual operations are required in the U.S. Pat. Nos. 4,121,789 and 4,144,821 patents, the U.S. Pat. No. 3,986,460 patent can be, to some extent, foot operated. However, the U.S. Pat. No. 3,986,460 construction is quite complex and expensive, requiring many parts, including a constantly projecting roll-over bar which releases a locking member when engaged by a freight container.

In view of the shortcomings of the aforementioned prior art devices, there is a need for an improved cargo restraint module for the restraining of cargo containers and pallets in transport vehicles.

Thus, it is a primary object of this invention to provide a novel cargo unit load device restraint module for use in transport vehicles and, in particular, for an improved restraint mechanism for use in quick-change passenger/cargo airplanes.

It is another object of this invention to provide novel and improved center-guide and side cargo restraint modules and mechanisms that can be entirely and simply foot released, and stick or other such device activated, to provide rapid single step unidirectional motion changeover from a retracted to an extended mode, and vice versa, without complex manual operations and without the need for spring operation.

Still another object of this invention is to provide a novel and improved cargo unit load device restraint module which is of simple and inexpensive design, and which is readily constructable for about 1¼ cargo handling systems.

Yet another object of the invention is to provide a novel and improved cargo unit load device restraint module which, because of its simple construction, is readily adaptable for the inclusion therewith of other cargo or seat pallet handling or guide mechanisms.

DISCLOSURE OF INVENTION

The invention comprises an improved retractable center guide and side cargo restraint module for use in vehicles having supporting floor structures. The restraint mechanism includes a latch mechanism provided with a vertical cargo restraint lip which projects above the upper surface plane of the floor structure when the mechanism is erected. A cargo pallet or container having a bottom portion adapted to receive the restraint lip is secured against damaging lateral and vertical movement when the latch-restraint lip is engaged with the bottom portion.

The latch (including the restraint lip) is one of three links which are arranged in such a manner that upon application of a downward force on the restraint lip the entire mechanism is retracted below the top-surface plane of the floor structure. The links operate in an over-center mode when the mechanism is erected, and require no additional locking or release mechanisms to perform the cargo restraint and mechanism retraction functions. However, to prevent undesirable rattling of the mechanism and a somewhat more desirable snapping action, a leaf spring is provided which follows a surface of a second one of the links which is provided with two flat cuts. When the mechanism is erected, the spring is urged against a corner of one of the flat cuts, and when it is retracted, it is urged against a corner of the other flat cut.

A third one of the links is provided with a lever which, when pressed, causes the mechanism to move to its over-center erected position ready to engage the cargo pallets or containers.

In another embodiment of the invention, two restraint mechanisms are arranged in a frame to form a center guide and restraint module. In this arrangement, the cargo restraint lips of the two-three linkage mechanisms are arranged adjacent to each other with the restraint lips directed in opposite directions. Thus the single module is provided with two restraint lips adapted to secure one side of two individual cargo pallets or containers.

The two mechanisms of the above center guide and restraint module retract in opposite directions leaving within the frame two unused spaces or areas. In a further embodiment of the present invention these areas are utilized to house additional mechanisms. For example, when the center-guide and restraint module is utilized in a quick-change passenger/cargo airplane, these spaces are utilized to accommodate a retractable seat pallet guide. When the cargo airplane is to be converted to a passenger plane, the seat pallet guide can be erected, while the cargo pallet center-guide and restraint mechanisms can be retracted.

The novel features which are believed to be characteristic of the invention, both as to its organization and to its method of operation, together with further objects and advantages thereof, will be better understood from the following description considered in connection with the accompanying drawings, in which presently preferred embodiments of the invention are illustrated by way of examples.

BRIEF DESCRIPTION OF DRAWINGS

FIG. 3 is a side view, partially in section, of the cargo restraint mechanism of FIG. 2, showing the mechanism in its retracted position;

FIG. 4 is a side view, partially in section, of the cargo restraint mechanism of FIG. 3, showing the mechanism in its erected position;

FIG. 8 is a plan view of another embodiment of a center-guide cargo restraint and seat pallet guide mechanism in accordance with the present invention, taken on line 8—8 of FIG. 1; and FIG. 9 is a cross-section taken along line 9—9 of FIG. 8.

BEST MODE FOR CARRYING OUT THE INVENTION

As described hereinabove, the purpose of a cargo unit load device restraint mechanism is to provide side and vertical restraint to cargo carried in devices such as containers or pallets. In the airplane industry, it is often desired to utilize a single plane for alternatively carrying passengers or cargo. Obviously, the quickest and most conveniently operable system of restraints for carrying out conversion of the aircraft from a passenger-carrying mode to a cargo-carrying mode, and vice versa, is desirable. Generally, restraint mechanisms which extend above the top surface plane of the floor for restraining cargo, and which can be retracted below the top surface of the floor for conversion of the aircraft to a passenger-carrying mode, have found acceptance in the industry. The purpose of the present invention is to provide an inexpensive, low profile, quick and easy to operate, and dependable cargo restraint mechanism for quick-change passenger/cargo airplanes.

Figure 1:
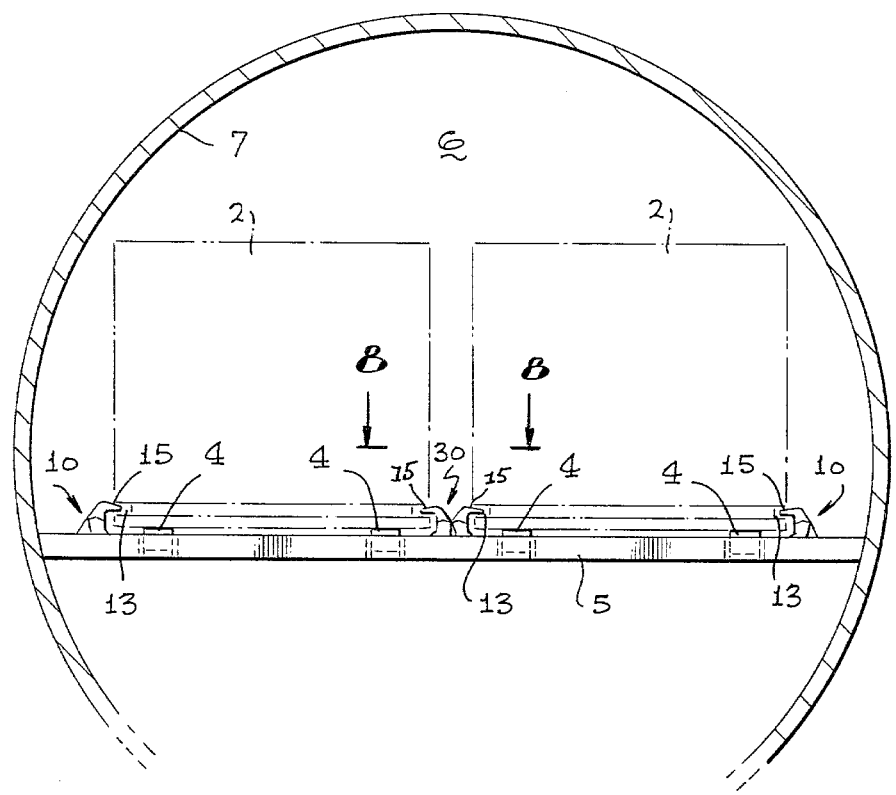
FIG. 1 is a partial cross sectional view of a cargo compartment of an aircraft showing the restraint mechanisms of this invention installed therein.

Referring now to the drawings, wherein like numerals denote like parts, FIG. 1 shows a cross-section of an airplane fuselage and inner compartment in a cargo-carrying mode. The fuselage 7 and floor 5 form a cargo compartment 6 in which is transported or secured cargo containers or pallets 2. The pallets 2 can be moved along and are sustained and supported by conveyor or weight bearing rollers 4 and are secured or restrained by a series of side cargo restraint mechanisms 10 and center-guide restraint units 30. The side restraint units 10 are provided with vertical cargo restraint lips 15 which engage within pallet indents 13 to restrain the pallets from vertical movement as a result of sudden loads on the aircraft. Center-guide restraint units 30 are provided with similar vertical restraint lips 15. In order to convert the aircraft from a cargo to a passenger-carrying mode the restraint units 10 and 30 are adapted to be retracted beneath the conveyor roller plane so as to permit unobstructed passage of other items, such as palletized passenger seats, on the conveyor roller plane.

Figure 2:
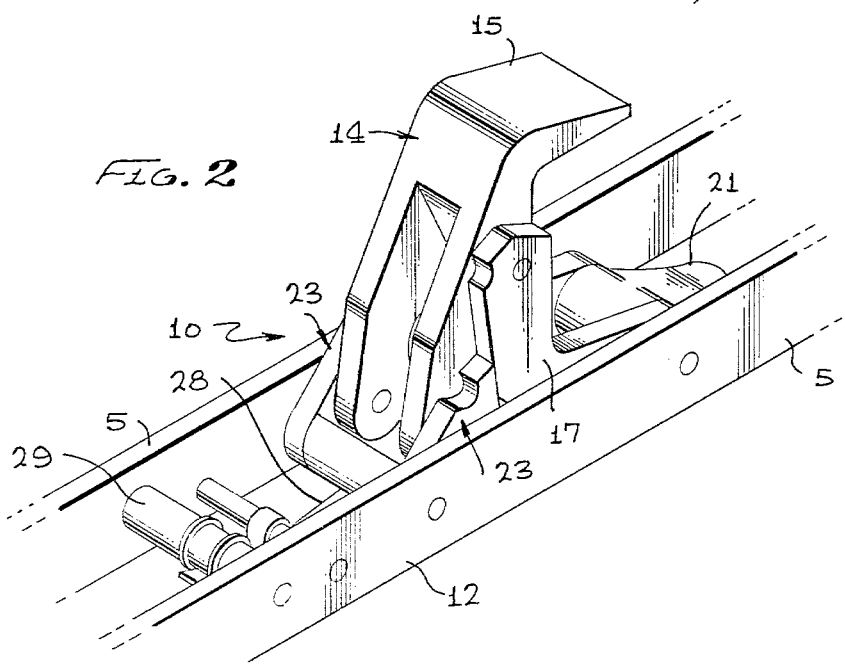
FIG. 2 is a perspective view of a retractable cargo restraint mechanism in accordance with one embodiment of the present invention.

A perspective view of a cargo restraint mechanism 10 in accordance with a first embodiment of the present invention is shown in FIG. 2. As depicted therein, floor 5 has a cargo restraint mechanism 10 arranged in spanning engagement with two parallel structural floor beams 12. The restraint mechanism 10 is shown in erected position and may readily be retracted to a position below the top surface plane of the floor 5. A better and more complete understanding of the operation and positioned relationships of the various parts which make up the restraint mechanism 10 may be had be reference to detailed FIGS. 3–7.

Referring to FIGS. 3–7, there are shown therein several views of a basic cargo restraint mechanism in accordance with a first preferred embodiment of this invention, with the various parts of the mechanism shown secured to individual beam members of the beam system 12. The restraint mechanism comprises three primary moving parts or links, including a latch 14, and the links 17 and 23, as well as a double acting leaf spring 28 which follows the cam surface 31 of the link 23. The leaf spring 28 presses against a corner of a flat cut 27 when the restraint mechanism is in the erected position (FIG. 4), urging the mechanism to remain the erected position. The spring also urges the restraint mechanism 10 to maintain a retracted position by exerting pressure at the corner 34 of a flat cut 26 on the cam surface 31 (FIG. 3) when the mechanism is retracted.

The latch 14 terminates in a vertical cargo restraint lip 15 which engages with the pallet indents 13 (FIG. 1) to restrain the cargo. The latch 14 is pivotably connected to the link 17 via a pin 18 and to the link 23 via the latch arms 16 and a pin 24. The links 17 and 23 are rotatably secured to the cross beams 12 via the pins 19 and 25, respectively. It should be apparent that the pins 18, 19, 24 and 25 may be secured to latch 14, beams 12, and link 23 by any well known means, as for example press or interference fit, interfaced screw threads, deformation, cement, adhesives, etc. The pin 18 is shown secured to the latch 14 via a retaining rivet 20 (FIG. 7), and could optionally be retained in position by securement to the link 17, if desired. It should be noted that the pin 24, having a path of travel entirely between respective walls of the beams 12, need not be secured, inasmuch as it will stay in position once the restraint mechanism is assembled. The leaf spring 28 is secured in place by a wrap-around engagement with a pin 22 and a nylon retainer and pin 29. It can be seen that with this particular arrangement, easy replacement of a broken leaf spring can be carried out without disassembly of the restraint mechanism.

The cargo restraint mechanism of FIGS. 2–6 is erected by pushing down on a lever 21 provided at one end of link 17, as indicated by arrow F in FIG. 3. When the lever 21 is pressed (FIG. 3), as by finger or with a rod-like element, the link 17 is caused to rotate about the pin 19, thereby simultaneously elevating and rotating the latch 14 such that the restraint lip 15 takes the erected position depicted in FIG. 4. In so moving, the end of the latch 14 opposite the restraint lip 15 causes rotation of the link 23, (via the pin 24) moving it "overcenter" to thereby lock the mechanism in its erected position (FIG. 4). This over-center movement and relationship between the link 23 and the latch 14 permits effective operation of the restraint mechanism even in the absence of the leaf spring 28. Abutment at the interface 35 of the links 23 and 17, serves to act as a stop when the mechanism 10 is erected.

Figure 5:
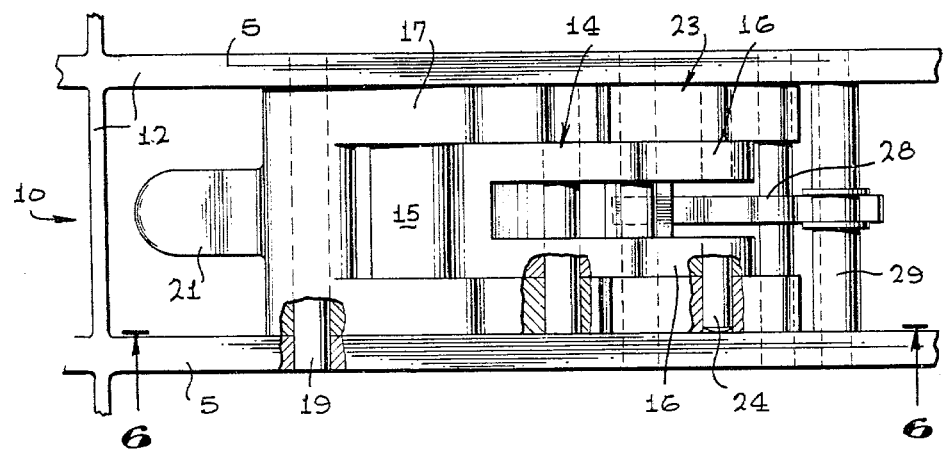
FIG. 5 is a plan view taken on line 5—5 of FIG. 3.
Figure 6:
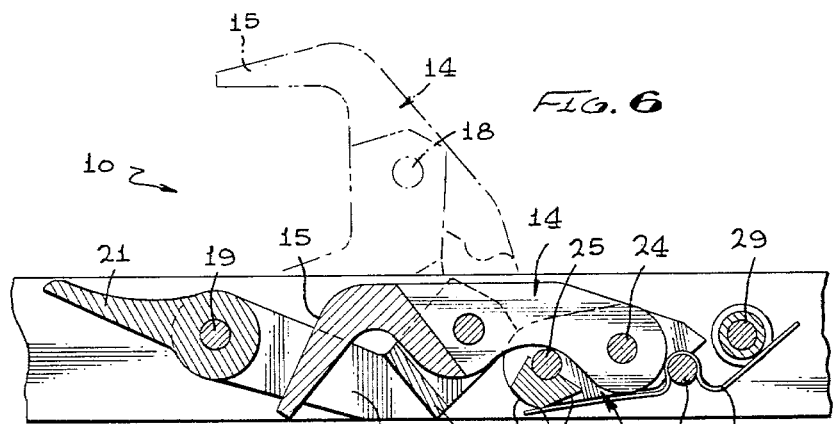
FIG. 6 is a cross-section taken on line 6—6 of FIG. 5, showing the mechanism of FIG. 3 in its retracted position, and also showing the cargo restraint element of the mechanism in its erected position (phantom)
Figure 7:
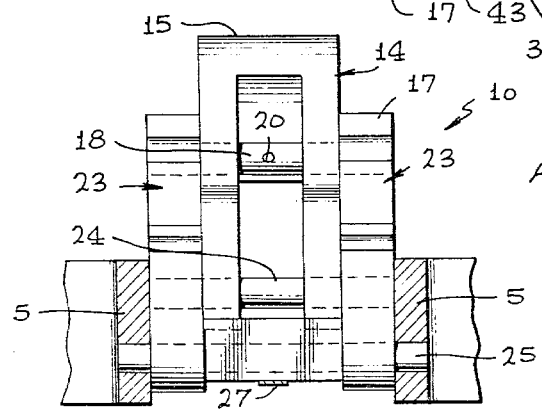
FIG. 7 is an end elevation of the cargo restraint mechanism.

To retract the cargo restraint mechanism an operator need merely press down on the top of the restraint lip 15, as by stepping thereon (arrow F in FIG. 4), thereby causing the links 23 and 17 to pivot about the pins 25 and 19 respectively, causing the mechanism to assume the retracted configuration depicted in FIGS. 3 and 5. Again, the entire operation can be carried out without the presence of the leaf spring 28. The crossover piece 43 of the link 17 acts as a stop against the surface 38 of the latch 14 when the mechanism 10 is retracted.

In its erected position, the restraint mechanism is held to a minor extent by interaction of the leaf spring 28 with the flat cut 27 (FIG. 4). This interaction helps to prevent inadvertent retraction of the mechanism, and requires the exertion of a mild "overcome" force to retract the mechanism. In its retracted position, the restraint mechanism is moderately held or biased by interaction of the leaf spring 28 with the corner 34, urging the link 23 to rotate clockwise about the pin 25. This urging force, while not essential, serves to aid in preventing rattling of the restraint mechanism. The overall effect of the leaf spring 28 is to lend somewhat of a snap-acting quality to the restraint mechanism.

A retractable center-guide cargo restraint and seat pallet guide module 30 in accordance with another embodiment of the present invention is shown in FIGS. 8 and 9. In accordance with this embodiment, two cargo restraint mechanisms disclosed in FIGS. 2–6 are arranged adjacent to each other, with the vertical cargo restraint lips 15 being pointed in opposite directions to restrain cargo as shown in FIG. 1. The mechanisms are mounted within a mounting frame 42 which is secured to the beams 12 in any suitable manner, such as by studs 44 or the like (one shown, FIG. 8). This particular arrangement of restraint mechanisms can, of course, be mounted directly to the beams 12, as shown in FIG. 2, with two latches 14 mounted such that two cargo restraint lips 15 point in opposite directions. However, for purposes of easier assembly and servicing, use of a mounting frame 42 is felt to be preferred. Such a frame can, of course, be utilized with a single side restraint mechanism. Thus, the cargo restraint mechanism of FIGS. 2–7 could readily be mounted within a frame to form a restraint module which could readily be attached to a beams 12 of a floor 5.

In mounting two restraint mechanisms as in FIGS. 8 and 9, a substantial unoccupied area or space 41 is left within the mounting frame 42. It thus becomes possible to mount other mechanisms therein, such as the retractable seat pallet guide mechanisms 39. The pallet guide mechanisms 39 are pivotally mounted via the common axle pins 46 which replace the pins 19 (FIGS. 2–7) passing through the links 17. A flat cut 48 is provided on the pallet guide mechanism 39, the corner of which interacts with the end 49 of the leaf spring 28 (shown engaging the nylon retainer 29 in FIGS. 2–7). The seat pallet guide mechanism 39 is erected by pressing on levers 45 or by pulling on the end 47 thereof. Retraction is carried out by pressing down on end 47, such as by foot, causing the spring force of the leaf spring 28 to be overcome and retracting the seat pallet guide mechanism.

The center-guide cargo restraint embodied in FIGS. 8 and 9 could, of course, be arranged in a back-to-back configuration. However, in an aircraft environment loss of space, that is the distance from the side of one pallet to the side of the next pallet held by the guide, is of critical importance. Normally, it is desirable to arrange the pallets as close to each other as possible.

Height considerations are also critical in aircraft cargo environments. Thus, a restraint mechanism which is retractable into a minimum height is highly desirable. The linkage arrangement of the restraint mechanism of the present invention is capable of being retracted into a frame of about one inch height, and is, thus, readily adaptable to fit within a small physical envelope, well beneath a 1¼ inch height conveyor roller plane such as is commonly found in many quick-change passenger/cargo airplanes.

Another critical aspect of the restraint mechanism of the instant invention is simplicity, and, thus, economy and ease of manufacture. The basic restraint mechanism consists of three major parts (links), plus a spring mounted in a frame structure. The links can readily be manufactured as by investment casting, extruding, machining, or like operations, while the helper spring is a simple leaf spring. Moreover, the self-locking over-center geometry of the restraint mechanism of the present invention permits proper functioning of the unit, even in the event the helper spring becomes inoperative.

Finally, operation of the restraint mechanism in accordance with the present invention is simple and non-labor intensive. Retraction of the device is accomplished by a simple unidirectional downward force, that is, an operator need merely step on the restraint lip 15 and the entire unit collapses or retracts flush with the plane of the top surface of the frame in which the unit is installed. In like fashion, a simple unidirectional force erects the device. Any rod-like member which is adaptable to press down on the lever 21 erects the device. Thus, an operator could merely press the lever 21 with a finger, or stand erect and press the lever with the end of a rod, stick or the like. It should be apparent, therefore, that utilization of the cargo restraint mechanisms of the present invention would render an aircraft containing such mechanisms within the floor framework a highly efficient quick-change passenger/cargo airplane.

While the cargo restraint mechanisms in accordance with the present invention have been described with reference to particular embodiments, it should be understood that such embodiments are merely illustrative, as there are numerous variations and modifications which may be made by those skilled in the art.

INDUSTRIAL APPLICABILITY

The cargo restraint mechanism is useful in quick-change passenger/cargo airplanes wherein it is desired to rapidly convert the aircraft from a cargo mode of operation to a passenger mode, and vice versa.

I claim:

1. A cargo restraint mechanism for securing a cargo unit load device in a vehicle having a floor structure, comprising:
    means for restraining said unit load device;
    means associated with said floor structure and said restraining means for alternatively transferring said retaining means to an erected position above the top surface plane of said floor structure and a retracted position below said top surface plane;
    means interacting with said transferring means for receiving a first unidirectional force such that upon application of said force said restraining means is movable from said retracted position to said erected position;
    said transferring means being further adapted to transfer said restraining means from said erected position to said retracted position upon application of a second unidirectional force to said restraining means.

2. The cargo restraint mechanism according to claim 1 wherein said transferring means comprises a linkage mechanism including a latch element, and first and second link elements, said means for restraining comprising a restraining lip on one end of said latch element, one end of said first and second link elements being rotatably secured within said floor structure and the opposite ends of said first and second link elements being rotatably attached to said latch element.

3. The cargo restraint mechanism according to claim 2 wherein said first and second link elements and said latch element have an over-center stop arrangement when said restraining means is in said erected position.

4. The cargo restraint mechanism according to claims 1, 2, or 3 wherein said transferring means is mounted within a mounting frame adapted for securing said transferring means to said floor structure.

5. The cargo restraint mechanism according to claims 1, 2, or 3 including spring means adapted for engagement with an element of said transferring means for biasing said cargo restraint mechanism to maintain said erected and retracted positions.

6. The cargo restraint mechanism according to claim 5 wherein said spring means comprises a single operable leaf spring.

7. The cargo restraint mechanism according to claim 1 wherein said means for receiving a first unidirectional force comprises a lever portion associated with an element of said transferring means.

8. The cargo restraint mechanism according to claim 2 wherein said means for receiving a first unidirectional force comprises a lever portion associated with said first link such that upon application of said first unidirectional force said first link element is rotated about said one end of said link element which is rotatably secured within said floor structure.

9. The cargo restraint mechanism according to claim 8 including a spring means operable against a surface of said second link so as to bias said cargo restraint mechanism to maintain said erected and retracted positions.

10. A self-locking cargo restraint module for securing a cargo unit load device to a vehicle floor structure, comprising:
    frame means adapted to be mounted to said floor means;
    means for restraining said unit load device; and
    a linkage mechanism, said linkage mechanism including a plurality of links rotatably secured to said frame means and associated with said restraining means for alternatively transferring said restraining means to an erected position above the top-surface plane of said frame means and a retracted position below said top-surface plane, said plurality of links having an over-center stop arrangement when said restraining means is in said erected position.

11. The cargo restraint module according to claim 10 including a spring means adapted for engagement with an element of said linkage mechanism for biasing said cargo restraint module to maintain said erected and retracted positions.

12. The cargo restraint module according to claim 10 wherein said linkage mechanism means includes a latch element pivotably secured to first and second link elements, said means for restraining comprising a restraining lip on one end of said latch element, one end of said first and second link elements being rotatably secured to said frame.

13. The cargo restraint module according to claim 12 wherein said first link element includes a lever portion, said linkage mechanism being adapted such that upon application of a unidirectional force to said lever portion said restraining means is transferred to said erected position.

14. The cargo restraint module according to claim 10, or 12 wherein said linkage mechanism is adapted to transfer said restraining means from said erected position to said retracted position upon application of a second unidirectional force to said restraining means.

15. The cargo restraint module according to claim 12 including a retractable seat pallet guide, said seat pallet guide being rotatably secured to said frame so as to be operable to erected and retracted positions relative to the top-surface plane of said frame.

16. The cargo restraint module according to claim 15 wherein said second link element includes a first cam surface and said seat pallet guide includes a second cam surface, and including a leaf spring engageable with said first and second cam surfaces whereby said restraining lip and said seat pallet guide are biased in said erected and retracted positions.

* * * * *